March 8, 1966 G. DEARSLEY 3,238,825
METHOD OF FEEDING AND CUTTING FILTERS
Original Filed May 18, 1955 11 Sheets-Sheet 1

INVENTOR
GEORGE DEARSLEY
BY
ATTORNEY

March 8, 1966 G. DEARSLEY 3,238,825
METHOD OF FEEDING AND CUTTING FILTERS
Original Filed May 18, 1955 11 Sheets-Sheet 2
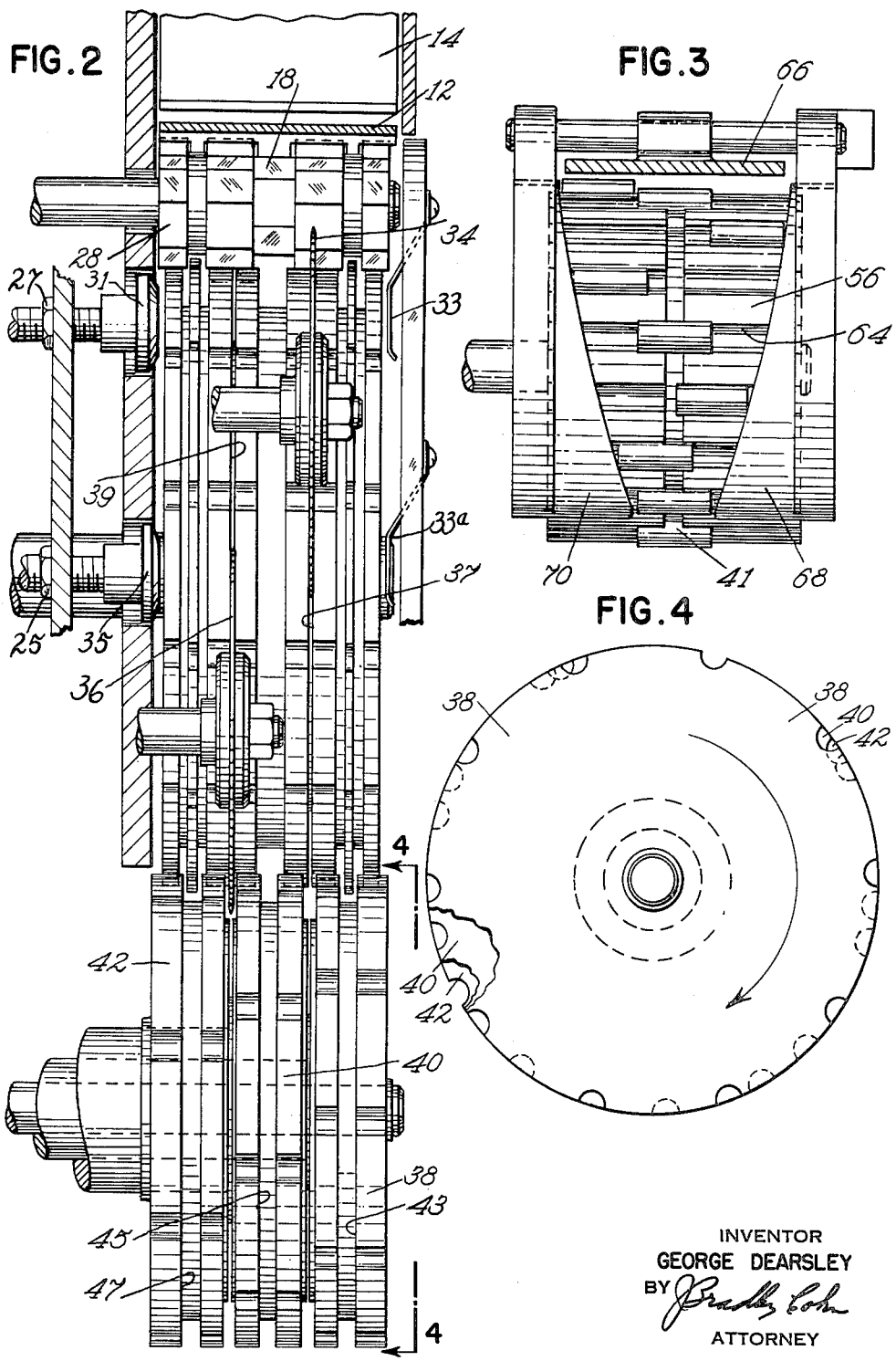
INVENTOR
GEORGE DEARSLEY
BY
ATTORNEY

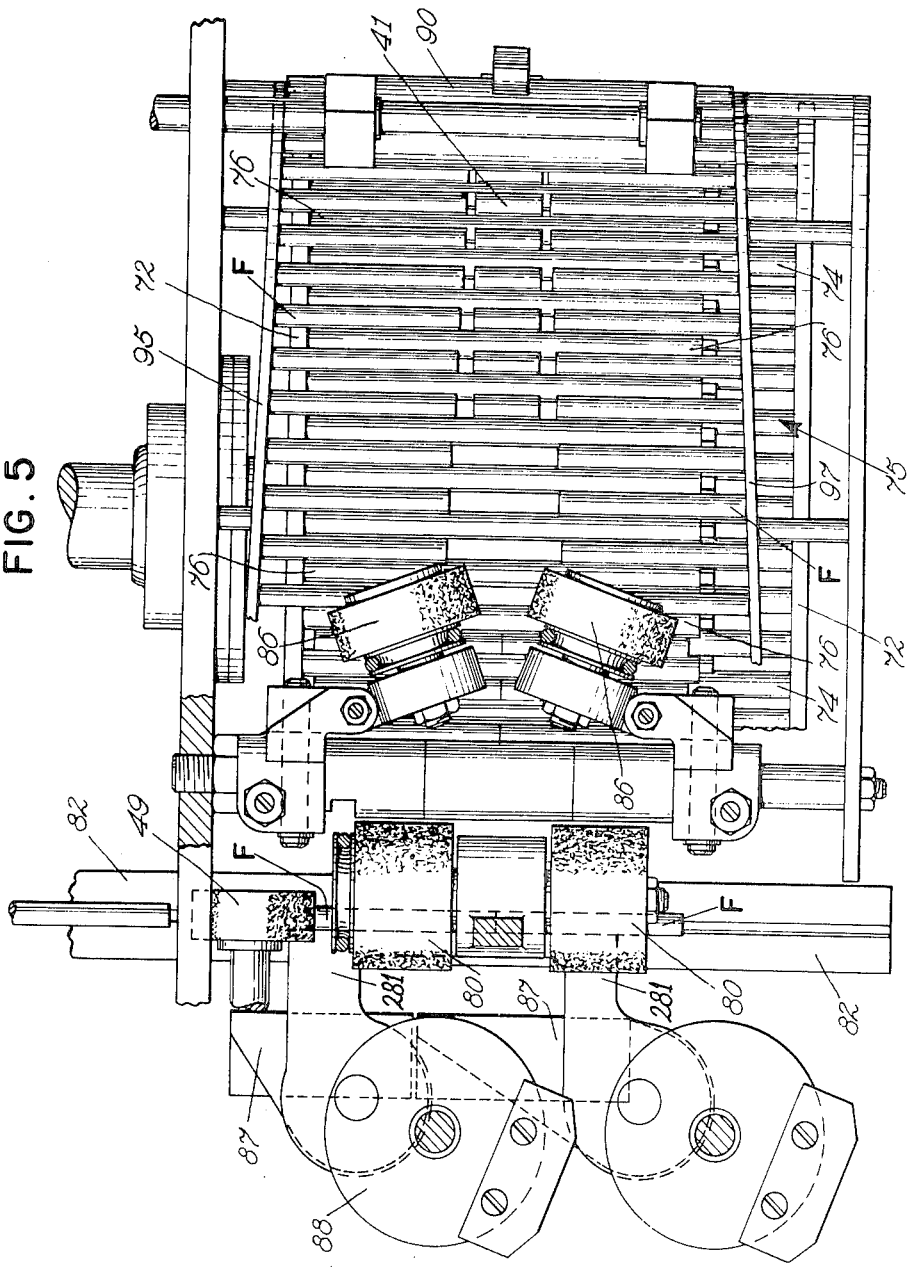

March 8, 1966  G. DEARSLEY  3,238,825
METHOD OF FEEDING AND CUTTING FILTERS
Original Filed May 18, 1955  11 Sheets-Sheet 5
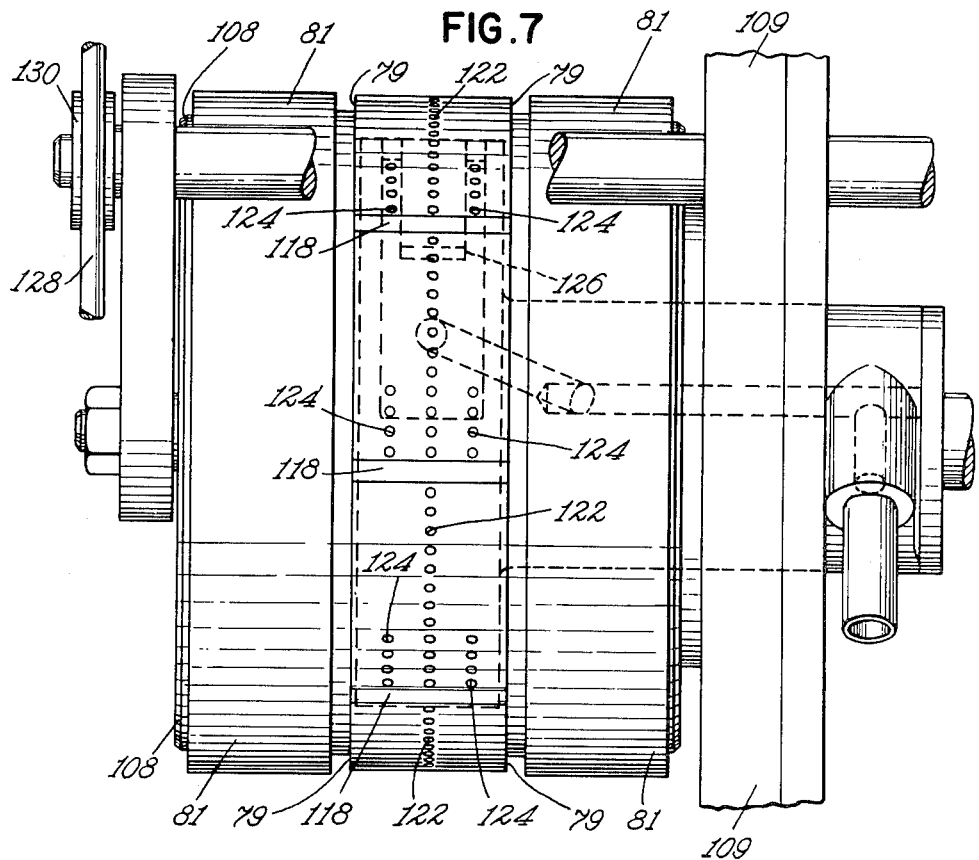
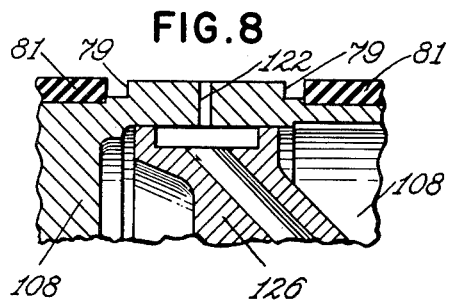
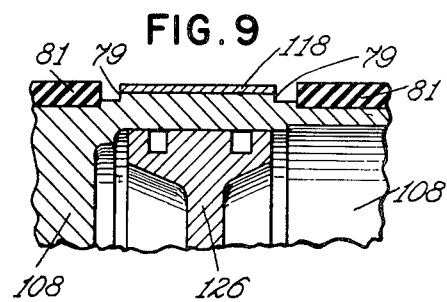
INVENTOR
GEORGE DEARSLEY
BY
ATTORNEY March 8, 1966  G. DEARSLEY  3,238,825
METHOD OF FEEDING AND CUTTING FILTERS
Original Filed May 18, 1955  11 Sheets-Sheet 7
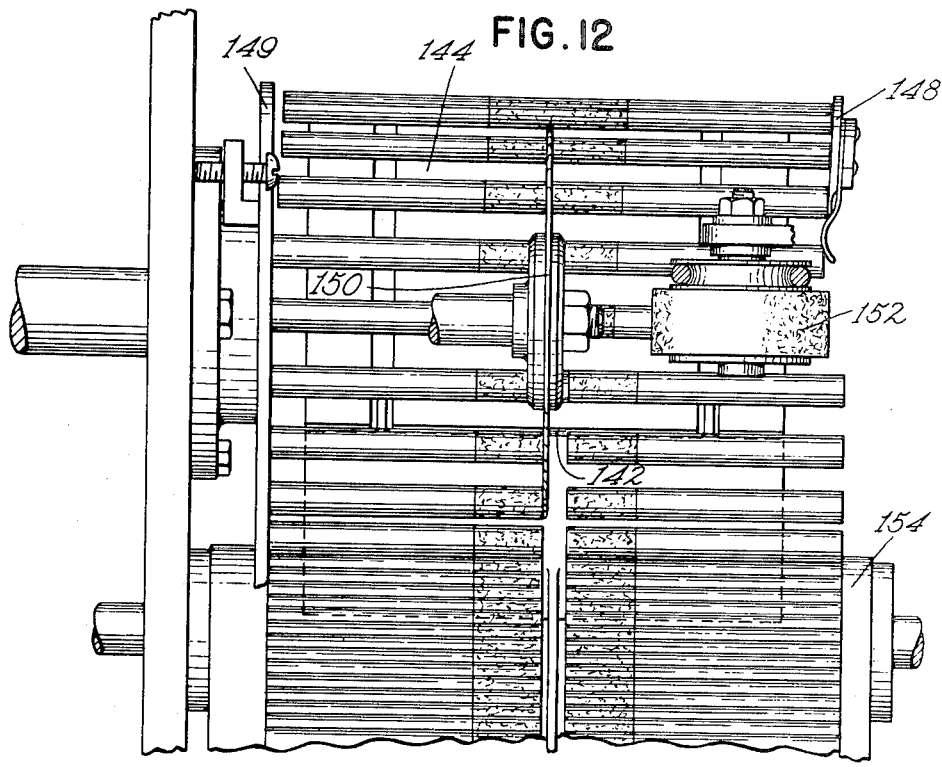
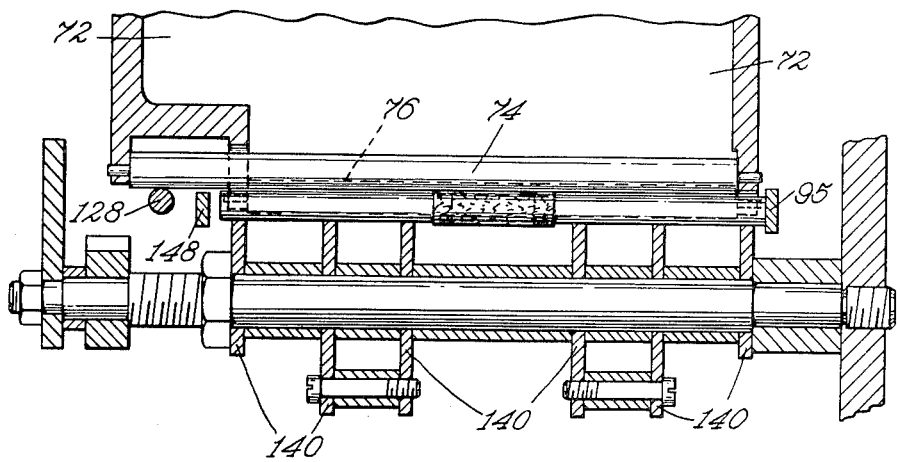
INVENTOR
GEORGE DEARSLEY
BY
ATTORNEY March 8, 1966  G. DEARSLEY  3,238,825
METHOD OF FEEDING AND CUTTING FILTERS
Original Filed May 18, 1955  11 Sheets-Sheet 8

INVENTOR
GEORGE DEARSLEY
BY
ATTORNEY

March 8, 1966  G. DEARSLEY  3,238,825
METHOD OF FEEDING AND CUTTING FILTERS
Original Filed May 18, 1955  11 Sheets-Sheet 9

INVENTOR
GEORGE DEARSLEY
BY
ATTORNEY

March 8, 1966  G. DEARSLEY  3,238,825
METHOD OF FEEDING AND CUTTING FILTERS
Original Filed May 18, 1955  11 Sheets-Sheet 10

INVENTOR
GEORGE DEARSLEY
BY
ATTORNEY

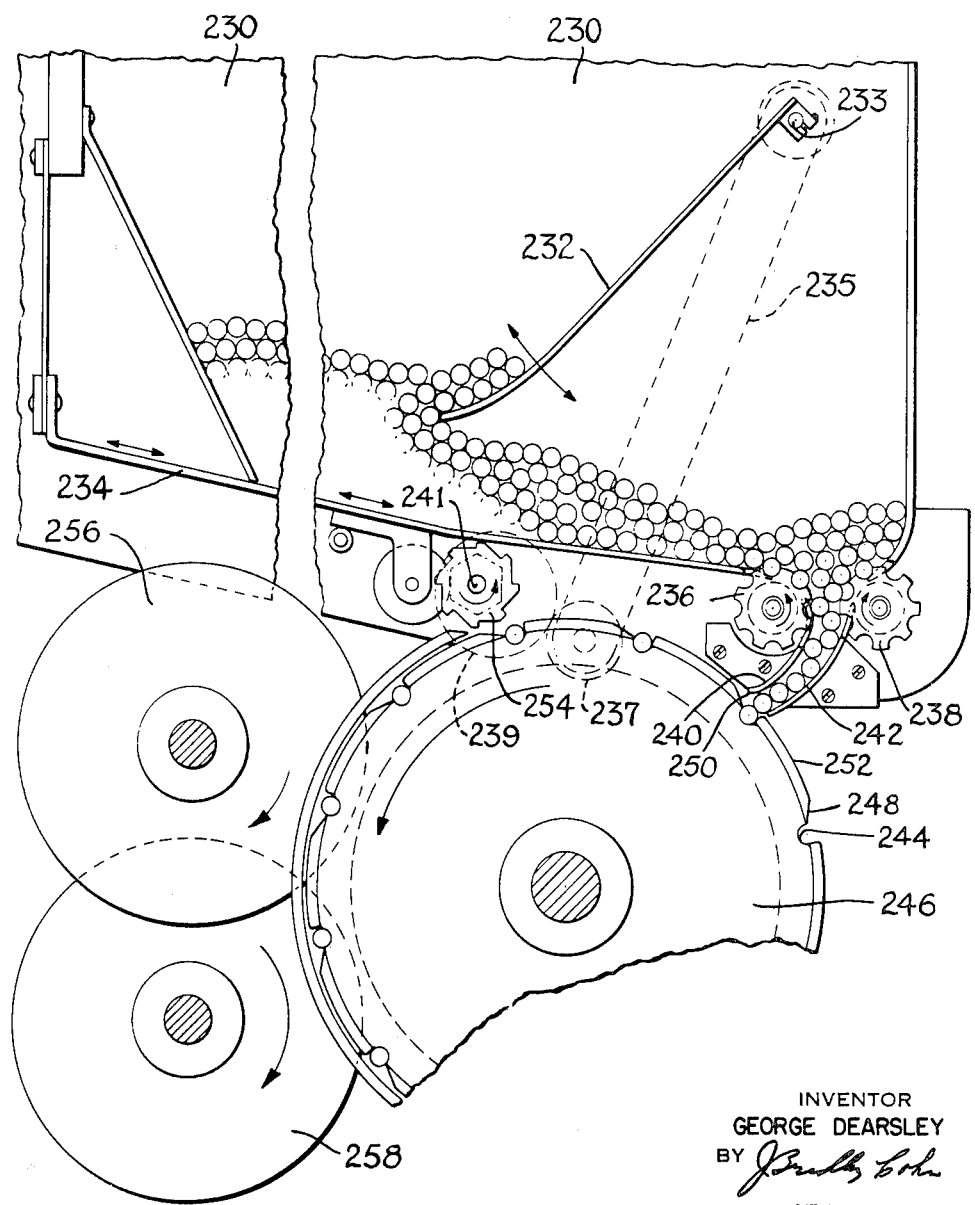

United States Patent Office 3,238,825
Patented Mar. 8, 1966

3,238,825
METHOD OF FEEDING AND CUTTING FILTERS
George Dearsley, Raleigh, N.C., assignor to American Machine & Foundry Company, a corporation of New Jersey
Application July 23, 1959, Ser. No. 829,007, which is a division of application Ser. No. 509,293, May 18, 1955, now Patent No. 3,036,581, dated May 29, 1962. Divided and this application Feb. 18, 1963, Ser. No. 266,122
6 Claims. (Cl. 83—25)

This invention relates to a method for supplying and cutting filter plugs for use in mouthpiece cigarette making machines, and particularly to that method which will allow the length of mouthpiece cut to be adjusted as desired.

This application is a division of my application Serial No. 829,007, filed July 23, 1959, and now abandoned, which in turn is a division of my application Serial No. 509,293, filed May 18, 1955 and now Patent 3,036,581, issued May 29, 1962.

The length of cigarettes and mouthpieces produced by different manufacturers may vary, depending on the public's preference. Since this may also change from time to time, the length popular at one particular time may have to be altered at another. The purpose of the present invention is to provide a mouthpiece cigarette making machine which will enable cigarettes having one length of mouthpiece material to be manufactured at one time and cigarettes having another length of mouthpiece material to be made at another time.

Another object of the invention is to provide a machine having positionally fixed rotating plug cutting knives, and adjustable stops and guide means for varying the relative position of the filter plug material with relation to the knives, so that predetermined plug lengths may be cut thereby.

Still another object of the invention is to provide improved means for severing multiple plugs so that they will be of the uniform size.

A further object of the invention is to provide an adjustable filter tip supplying and cutting device which is adaptable for mounting on various makes of cigarette making machine.

Yet another object of the invention is to provide an adjustable filter tip attachment which is capable of operating as rapidly as a conventional cigarette making machine and which will not necessitate setting up filter tip supplying and cutting machines in separate floor space or require the rearrangement or reorganization of cigarette making procedure in a cigarette manufacturing plant to adapt itself to the manufacture of filter tip cigarettes having the length of mouthpiece material desired.

Other objects and features of the invention will become apparent as the description of the particular physical embodiment, selected to illustrate the invention, progresses.

In the accompanying drawings, which form part of this specification, like characters of reference have been applied to corresponding parts throughout the several views which make up the drawings.

FIG. 2 is an end elevation, taken on line 2—2, of FIG. 1, illustrating a portion of the hopper, the plug receiving drum in conjunction with the cutting mechanism and the separating drums.

FIG. 3 is an end elevation, taken on line 3—3 of FIG. 1, showing the plug drum.

FIG. 4 is an end elevation of the plug separating drums taken on line 4—4 of FIG. 2.

FIG. 5 is a plan view partially in section taken on line 5—5 of FIG. 1, illustrating a portion of the cigarette carrier drum in conjunction with the cigarette infeed and separating mechanism at the cigarette infeed station.

FIG. 7 is an end elevation of the tip material carrying suction drum, taken on line 7—7 of FIG. 6.

FIG. 8 is a partial sectional end elevation of a peripheral portion of the suction drum, taken on line 8—8 of FIG. 6.

FIG. 9 is a partial sectional end elevation of a peripheral portion of the suction drum, taken on line 9—9 of FIG. 6.

FIG. 11 is a partial sectional end elevation of a peripheral portion of the carrier drum in conjunction with the cigarette guiding means, taken on line 11—11 of FIG. 6.

FIG. 12 is an end elevation of the cigarette cutting drum in conjunction with its separating means at the cigarette delivery station, taken on line 12—12 of FIG. 1.

FIG. 21 shows another embodiment of the apparatus for separating and subdividing multiple lengths of rod-shaped articles into equal subdivisions.

Figure 1:
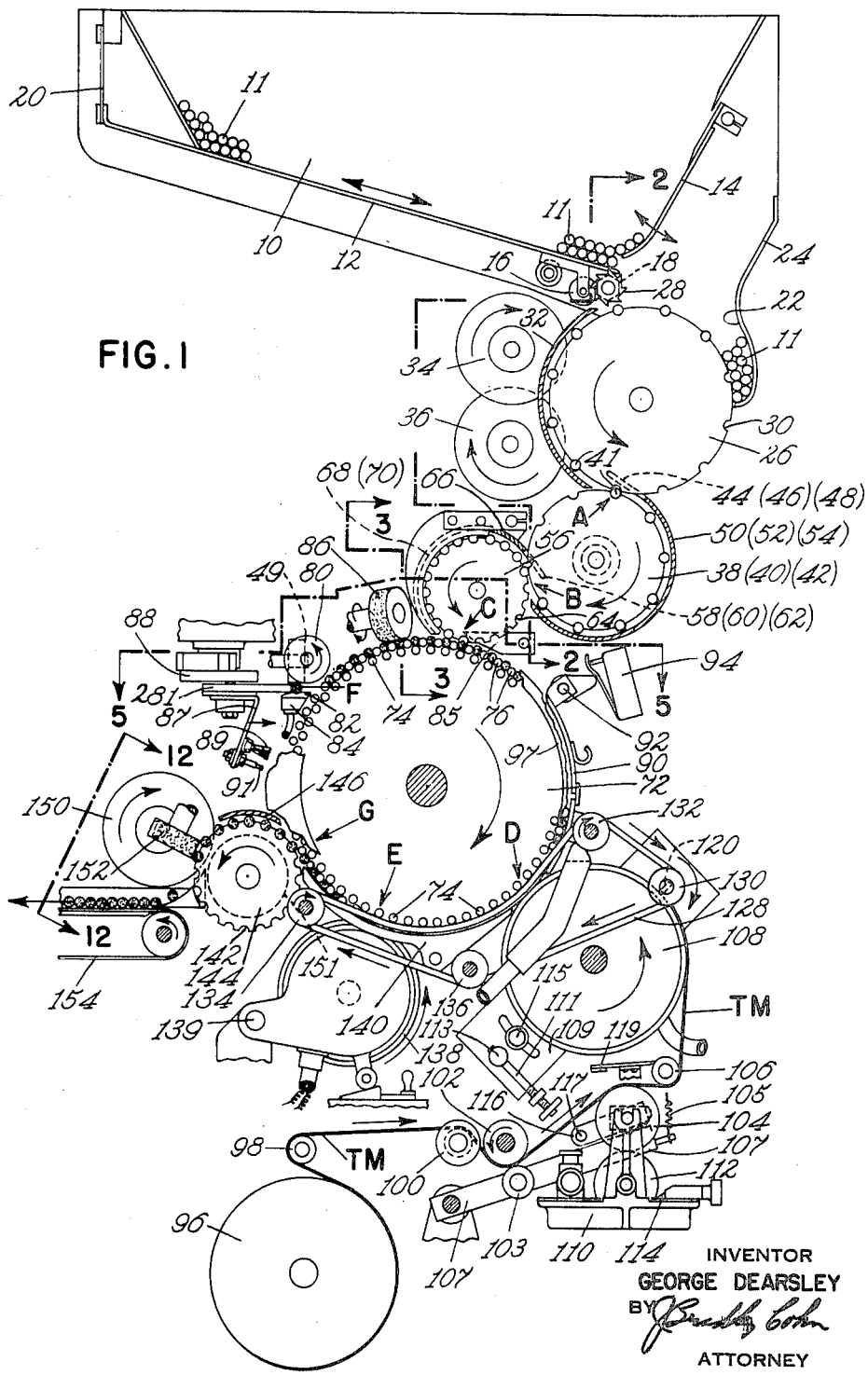
FIG. 1 is a side elevation, partly in section, illustrating the component parts of the cigarette filter tip mechanism.

My filter tip attaching machine is adapted to be secured to the end of a cigarette making machine where the finished cigarettes F are discharged from the cut-off and spacing belt, such as that shown in U.S. Patent 2,247,413 issued to R. E. Rundell on July 1, 1941. Since the present filter tip attachment is capable of operating at the rate of 1,000 cigarettes per minute, or at a still higher, or lower speed if that should be desired, which are the approximate speeds of conventional cigarette machines in use today, there is no need for a manufacturer to buy new cigarette making machines to make filter tip cigarettes.

My cigarette mouthpiece attaching apparatus consists of a mouthpiece hopper 10 into which a supply of sextuple lengths of mouthpieces are placed. Mouthpiece material is commonly purchased in sextuple lengths to facilitate handling. The embodiment of the mouthpiece cutting and aligning apparatus shown in FIGURE 1 consists of the inclined floor plate 12 of the hopper and the slanted side gate 14 which are agitated or oscillated by means of a suitable vibrator. In this embodiment this is accomplished by the cam roller 16 engaging with the hexagonal rotating cam 18. FIG. 21 described hereinafter shows another means for oscillating the slanted side gate 14. The agitator floor plate 12 has a spring mounting 20 at one end which permits the plate to be readily agitated when the filter tip attachment is operated.

The sextuple lengths of cigarette plugs 11 roll downwardly out through the space between the lower end of oscillating gate 14 and agitator floor plate 12 into the reservoir 22 made up of a side wall 24, a plug receiving and conveying drum 26 and the refuser wheel 28 (FIG. 1). The plug receiving and conveying drum 26 rotates in the direction indicated by the arrow and has plug receiving grooves 30 cut transversely across the periphery of the drum 26. As the drum 26 rotates and the grooves 30 pass under the reservoir 22 holding the sextuple lengths of filter plugs 11, an individual sextuple length of cigarette filter will fall under the action of gravity into each of the grooves or pockets 30.

In the event that two or more sextuple lengths of filter plug material partially fall into the same groove the rotating refuser wheel 28 pushes back the excess, so that only one sextuple length of filter plug is allowed to remain in each pocket 30 when it passes under the stationary, spaced retaining wall 32.

The refuser wheel 28 is so constructed that the teeth on the refuser wheel 28 rotate in timed relationship with the flutes or pockets 30 and in such relative angular position that a moving face is always present to remove any filter plug which may otherwise jam against the filter already nested in grooves 30 of drum 26.

Suitable flexible side guides 33 and 33a are provided for plowing over and urging each sextuple length of filter plug material up against the adjustable stop plates 31 and 35 (FIG. 2). The stationary guide members 31 and 35 may be moved in or out independently by means of a suitable screw adjustment 25 and 27 which can be set during the operation of the machine. By adjusting members 31 and 35, the lengths of the double length of filter plug material that is severed can be readily controlled.

It will be appreciated that while flexible side guides 33 and 33a have both been shown on one side of the device and the adjustable stop plates 31 and 35 on the other side thereof, these may be alternately positioned on either side of the device if required, without departing from the spirit of the invention.

As the drum 26 rotates in the direction indicated by the arrow, a first rotating disc knife 34, extending through a suitable slot (not shown) formed in the retaining walls 32 and into an annular groove 37 formed in the drum 26, severs a double length from the sextuple length of filter plug material as it passes between the flexible side guide 33 and the guide head 31.

As the plug receiving and cutting drum 26 continues its rotation, it brings the filter plug material between the flexible guide 33a and a second adjustable guide member 35. The flexible guide 33a urges the filter tip material up against the guide member 35.

It will further be appreciated that the plug may be positioned in the proper relationship against the stops 31 and 35 relative to the lower knife in a number of other ways, as for example, by mechanical plowing, by blowing, or timed hammer action, etc. (not shown).

By measuring from one end of the material in this manner, the space occupied by the knife when severing is automatically allowed for, because the first duplex length is severed to the desired length irrespective of knife thickness after which the two portions of the initial length of filter are reassembled in axial abutment to permit accurate measurement from the same end to the second cutting plane.

Since guide member 35 may also be adjusted in and out by means of its screw mounting 25, the point at which the second knife 36 severs the quadruple length may be readily set either when the machine is stopped or when the machine is running.

By this unique cutting arrangement the length of the three sections produced can be readily changed to accommodate a different sextuple length than was previously used with the machine. When a pair of knives are mounted to cut through a plug simultaneously it is impossible to vary the length of the center sections without relocating the cutting knives and changing the position of the annular grooves 37 and 39.

In other words, in this invention, I relocate the plug material prior to each cutting operation, rather than change the spacing of the cutting knives. As a consequence it is easy to accommodate sextuple length plugs of various lengths for cutting into three equal duplex lengths. The second cutting knife 36 similarly extends through another groove or slot (not shown) formed in the retaining walls 32 and into an annular groove 39 of the drum 26. As mentioned, this knife 36 severs the quadruple length of filter tip material into two double length filter plugs as it passes between the side guide 33a and the other guide head 35.

As the drum 26 continues its rotation, the double lengths of filter tip material are held in the grooves 30 by means of the retaining plate 32 until they are brought above the pockets of the plug separating drums 38, 40 and 42 shown in FIGURES 1 and 2 which rotate in the direction indicated by the arrow, as shown in FIGURE 1.

The double length filter plugs 41 are stripped from the cutting drum 26 by means of extensions 44, 46 and 48 of the double length retaining guide walls 50, 52 and 54, in the same manner as described in my copending parent application S.N. 509,293 filed May 18, 1955, now Patent 3,056,581, issued May 29, 1962. As the double lengths of filter plug travel on the plug separating drums 38, 40 and 42, they are separated circumferentially each from the other. At receiving station A, FIG. 1, the three plugs are in longitudinal alignment, each in an individual groove in an individual one of the three drums. Drum 40, however, rotates slightly faster than drum 38 and drum 42 rotates slightly faster than drum 40, so that by the time they reach station B only one double length filter plug at a time will be stripped from its respective separating drum 38, 40 and 42 into a groove of a plug aligning drum 56 (FIGURES 1 and 3) which rotates in the direction indicated by the arrow. This stripping action is effected by the strippers 58, 60 and 62 which extend into suitable grooves 43, 45 and 47 formed in the plug separating drums 38, 40 and 42.

As a consequence one double length filter plug is discharged into each of the pockets 64 of the plug aligning drum 56. As the plug aligning drum 56 carries the individual double length filter plugs around with it the double length filter plugs are held in their pockets by a suitable guide wall 66. As the double length filter plugs continue their rotation with the pockets 64, the ends of the double length filted plugs 41 come into engagement with the spaced plug aligning cams 68 and 70.

As the drum 56 continues its rotation in the direction indicated by the arrow, the double length filter plugs, because of their engagement with the aligning cams 68 and 70, are moved axially along the length of their respective pockets 64, so that by the time they reach station C they are all in the same position aligned in a row in side-by-side spaced relationship, as shown in FIG. 3. The plugs are then discharged by stripper 85 into suitable roller receiving pockets formed on the periphery of the assembly drum 72 in between two lengths of cut cigarette rod. Each pocket is made of three pivoted rollers, a short roller 76 on either side and longer inside roller 74.

The cut lengths of cigarette rod received from the cigarette making machine are spaced axially by suitable means such as speed-up roller 49 in a manner similar to that disclosed in U.S. Patent 2,124,397 granted to G. W. Gwinn et al. on July 19, 1938. A pair of suitable rubber rollers 80, shown in FIGURES 1 and 5, spaced from a stationary table bed 82 slow down the lineaer travel of the lengths of cigarette rod by engaging therewith. Suction is applied to the table 82 by means of a suction head 84 through which tobacco particles are withdrawn.

A kicker plate 281 is reciprocated horizontally by means of the crank 88 to push a pair of cut cigarette lengths F from between the retarding rollers 80 and the supporting table 82 into the pockets formed by the nest of rollers 74 and 76. The cigarettes so discharged, into the pockets of the cigarette assembly drum 72, are moved apart by means of a pair of rubber rollers 86 rotating in opposite directions, so that when the lengths of cigarette rod pass station C there will be sufficient space in between the cigarettes for the plug aligning drum to discharge its double length filter plug therein.

The cigarette assembly drum 72 rotates continuously in the direction indicated by the arrow, carrying with it the assembly of two spaced cigarette lengths and a double length filter plug located therebetween in the pockets formed by the rollers 74 and 76.

A guide bar 85 partially extends around and is spaced from the periphery of the path of rotation and employed for the purpose of properly seating the plugs between the cigarettes F in their respective pockets. A jam gate 90 is pivotally mounted on a suitable pivot 92 so that if more than one cigarette, filter stub or some other substance should manage to fall into the pockets formed by rollers 74 and 76 the excess pressure would lift up the jammed gate 90 which in turn would actuate a suitable microswitch 94 which would stop the cigarette making machine.

Figure 10:
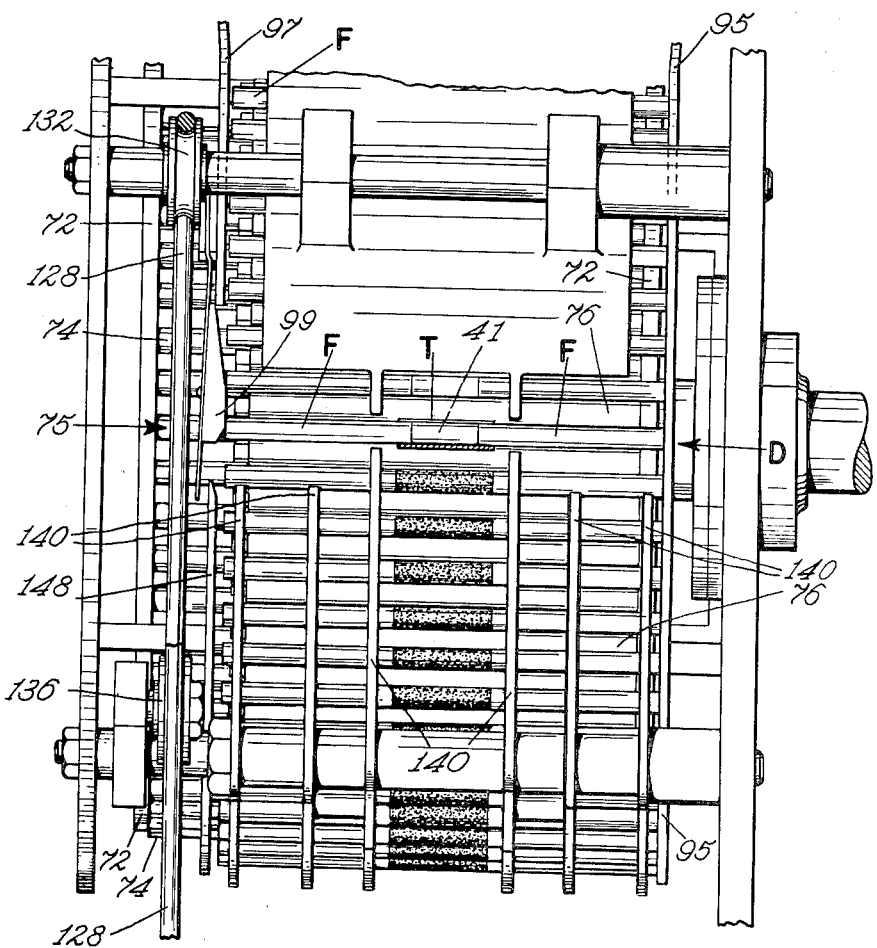
FIG. 10 is a partial end elevation of the cigarette carrier drum at the cigarette filter plug assembly station taken on line 10—10 of FIG. 6.

As the assemblies of double filter plugs and cigarette lengths continue their advance, they are gradually brought into abutment by means of a stationary guide 95 coacting with guide 97 as shown in FIGURES 5 and 10. The extreme end of the guide 97 is provided with a yieldable spring mounted guide shoe 99 which is employed for the purpose of achieving a firm abutment between the cigarette lengths and the double filter plugs.

The abutting cigarette lengths F and double length filter plug 41 are joined together by means of a uniting band T which is rolled around the assembly.

The uniting band material TM, as shown in FIG. 1, is fed from a reel 96 over pulleys 98 and 100 and between feed rollers 102 and 103 and over a paste applying roller 104 and around another guide roller 106 in the direction indicated by the arrows on to the band conveying suction drum 108. The feed rollers 102 and 103 are kept in constant engagement by a tension spring 105 connected to an arm 107 to which the feed roller 103 is pivoted. Adhesive material is stored in the glue pot 110 and is removed therefrom by a roller 112 which has excess paste trimmed therefrom by means of an adjustable scraper blade 114. The roller 112 engages with the paste applying roller 104 which transfers the glue to the under side of the uniting band material TM.

In the event the filter tip attachment is stopped for any reason, the arm 116 carrying a band engaging extension 117 is elevated, lifting the uniting band material TM out of engagement with the glue applying roller 104 and into engagement with the stationary stop 119 so that the uniting band material will not adhere to the roller 104 and will be prevented from being pulled off the reel 96 by the movement of the suction drum 108 by reason of the fact that TM is gripped between extension 117 and stop 119.

The arm 116 simultaneously depresses the arm 107 thereby disengaging the feed roller 103 from the web TM and feed roller 102, thus effecting a stoppage of further feeding of the tip material TM.

Figure 6:
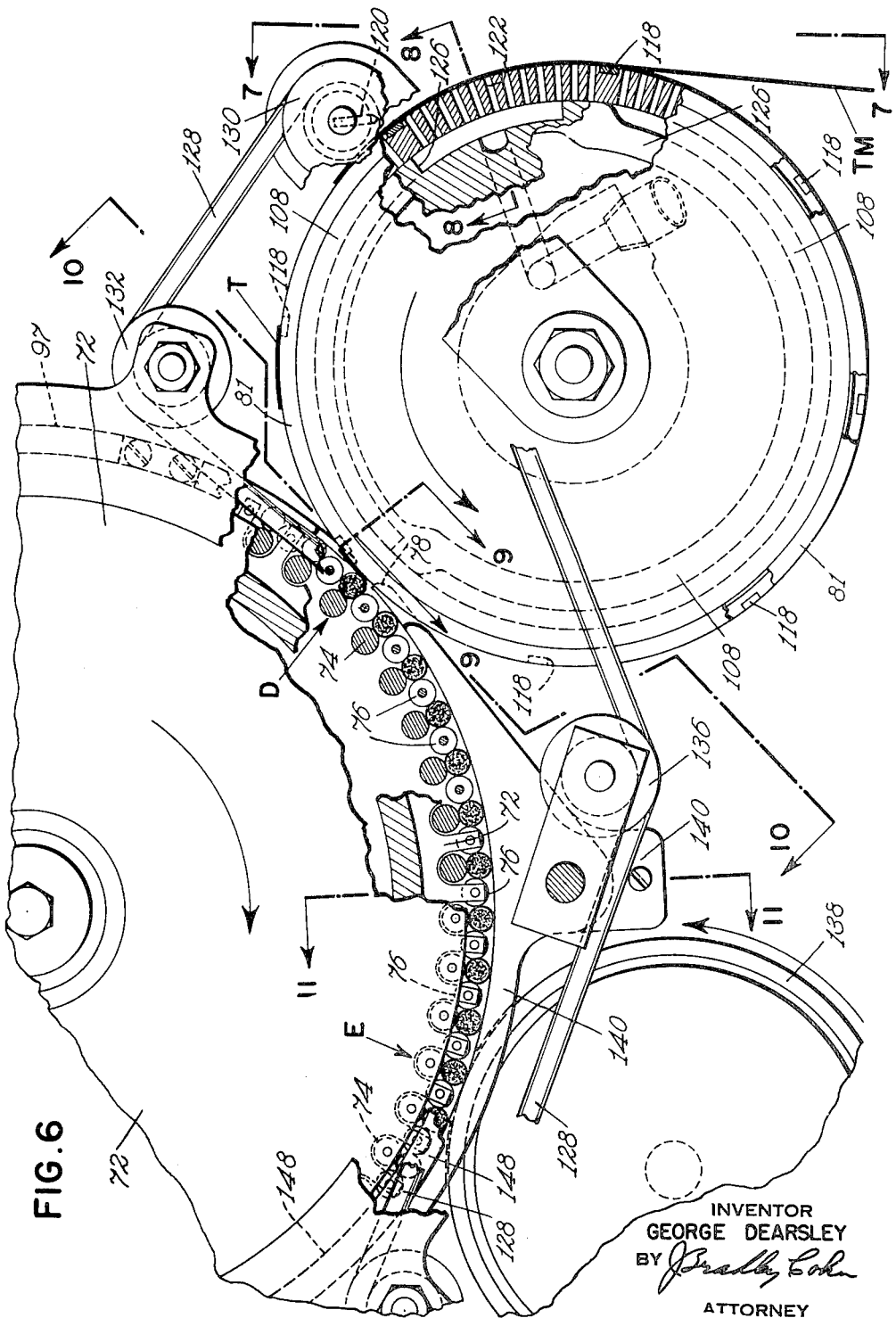
FIG. 6 is an enlarged side elevation, partly in section, of the cigarette filter plug assembly station illustrating a portion of the cigarette carrier drum in conjunction with the tip material carrying suction drum and cutting mechanism.

The drum 108, as shown in FIG. 6, has hard insert blocks 118 mounted at spaced intervals transversely across the periphery of the drum. These inserts 118 are so spaced as to serve as meeting blocks as opposite to the rotating cutting knife 120 also mounted transverse drum 108 each time each block 118 passes this point.

The suction drum 108 has a unique suction hole arrangement for holding the band or tip material in contact with the surface of the suction drum 108. It will be noted that the center suction holes 122 hold the cork tip material in contact with the drum 108, but there is a slippage that takes place between the suction drum 108 and the web TM due to the fact that feed drum 102 is driven at a slower peripheral speed than the drum 108 and the web slides on the drum 108.

As the material passes beneath the knife, the leading end of the tip material is severed to form a tip T. The latter, due to the higher speed of the tip drum 108, is carried to the tip applying station D and at the same time provides spacing between the tip T and the leading end of the tip material TM.

The suction drum 108 is supported by a plate 109 which is pivotally secured on the shaft of knife 120 and is adjustable by means of an adjusting spindle 111 engaging said plate 109 by means of a swivel stud 113. After setting, a suitable lockon screw 115 is turned to hold the plate 109 in a secured position. By means of this arrangement it is possible to move the suction drum towards and away from the assembly drum 72 thus varying the degree of pressure exerted on the filter tip assembly during the uniting band applying operation.

It will be appreciated that while I have shown the suction drum supporting plate 109 as being pivotally mounted about the shaft of the cutting knife 120, both the cutting knife 120 and the suction drum 108 could be otherwise suitably mounted to obtain the same result. The important factor to be borne in mind is that the relationship of the cutting knife 120 with respect to the suction drum 108 should not be changed so as to interfere with the proper operation of the uniting band conveying drum and cutting knife.

It will be noted, as shown in FIG. 7, that the holes 124 are positioned adjacent the sides of the suction drum so as to provide a firm grip across the width of the web TM at the time it is being severed. A suction cut-off cam 126 is provided for cutting off suction from the center holes 122 as they pass the suction cut-off cam 126 thereby avoiding any unnecessary loss of suction.

It will thus be noted that the center holes 122 extend continuously around the center portion of the periphery of the drum 108 while the groups of side holes 124 are spaced circumferentially around the drum in accordance with the spacing required by the severed pieces of uniting band material.

After the center holes have passed the cutting station the suction leading to this portion of the path of travel of the center holes is cut off while suction still is allowed to act upon the side rows of holes 124 which are covered by the severed tip T. It will be noted that the center holes are not all covered by the tip T because of the slippage and spacing of the cut tip T that is effected.

As the cigarette assembly drum 72 continues its rotation the inside rollers 74 have their projecting driving end 75 engage with the belt 128 which is driven from the drive pulley 130. The belt 128 passes over idler pulleys 132, 134 and 136. The section of belt between pulleys 132 and 134 are held in contact with the driven end 75 of the inside rollers 74 to impart rotary movement thereto. This has been found to be very desirable when operating at cigarette machine speed because by the time the cigarette assembly is about to have a uniting band applied thereto, it will already have begun to rotate and there will not be any sudden accelerations of the cigarette assembly at the moment the uniting band is brought into contact with the assembly. It also has the further advantage that the inside roller 74 does not have to be driven by the rubber rings 81 through the cigarette assembly which would subject the assembly to undesirable stresses and disrupt the arrangement of the tobacco filler therein.

The side rollers 76 are shorter than the inside roller 74 and also shorter than the assembled cigarette length to permit the side guides 95 and 97 to cam the components of each assembly together as shown in FIGURE 5. By the time the assembled cigarettes reach station D they are held in tight abutting relationship by side guide 95 and guide shoe 99.

The severed length of cork tip material carried by the suction drum rotating in the direction indicated by the arrow is brought into contact with the assembly of tightly held cigarettes. The rubber belts 81 and the surface of the drum 108 engage the cigarette assembly and in cooperation with driven inside roller 74 positively rotate the cigarette assembly, causing the tip T to be rolled about the assembly, between the rollers 74 and 76, and the suction drum 108.

The stripping fingers 78 ride in the recesses 79 and beside the rubber belts 81 to lift the banded cigarette assembly away from the drum 108 and confine it in the cradle of rollers 74 and 76.

When the assembly of cigarettes having the cork tip T applied thereon reaches the sealing station E they come in contact with a heater drum 138 rotating in the direction indicated by the arrow, which causes the assembly of cigarettes to be rolled within the nest of rollers and the sealing drum 138 to set and dry the adhesive carried on the cork tip material. During this portion of travel the cigarettes are held in their pockets formed by rollers 74 and 76 by means of a suitable guide plate 140 and the inner rollers 74 are positively rotated by means of belt 128 to impart to the cigarette assemblies a rotation similar to that imparted before and during the application of the uniting band.

The heating drum 138 may be mounted in a manner similar to that which supports the suction drum 108, so that it can be moved towards and away from the assembly drum 72 so as to readily regulate the pressure exerted on the cigarette, when the machine is running, so as to obtain the type of seal desired.

When the assembled cigarettes reach the station G they drop into the pockets 142 of the cutting drum 144 which rotates in the direction indicated by the arrow. A confining plate 146 surrounds the upper portion of the periphery of the cutting drum 144 and holds the assembled cigarettes in their respective pockets 142. A side guide or plough 148 (FIGURE 12) is employed to push the cigarettes up against a stationary stop 149 so as to bring the center of the double filter tip into the path of the rotating knife 150.

The knife 150 extends into an annular groove 151 formed in the cutting drum 144 so as to sever each assembly of cigarettes at their center into two filter tip cigarettes. When the cigarettes have been so severed a separating roller 152 engages with one of said severed cigarettes and pushes it axially away from the cutting knife along the groove 142, so as to provide a space between the severed cigarettes before they are discharged onto the catcher belts 154.

Every time the kicker plate 281 is moved forward it carries with it the arm bracket 87 which has on its ends a brush 89 and a finger 91. As the kicker plate completes its circulatory path of travel the brush and the finger will pass through a pair of adjoining spaced nests of rollers 14 and 76 on drum 72, clearing out any cigarettes or plug or tobacco material that might have remained in these nested roller holders.

Figure 17:
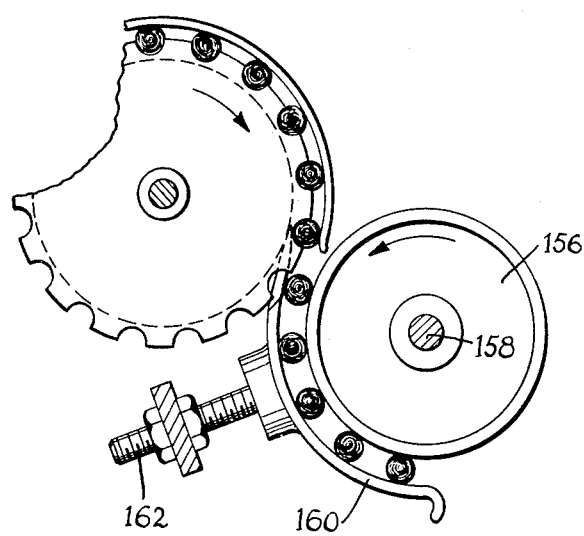
FIG. 17 is an end elevation illustrating a single drum coacting with a concave member for prerolling filter plugs.
Figure 18:
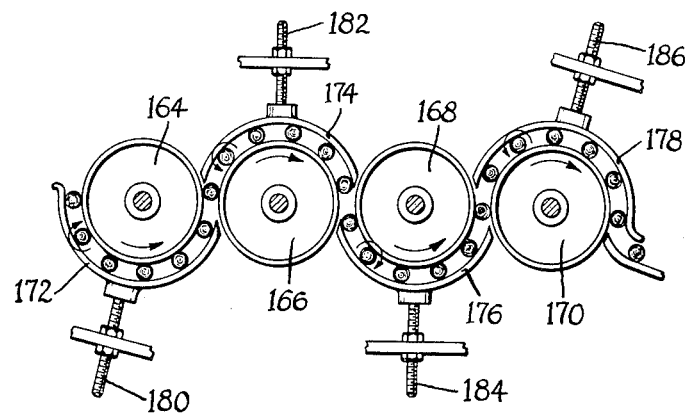
FIG. 18 is an end elevation illustrating a plurality of oppositely rotating drums for pre-rolling filter plugs.

In FIGURES 17 and 18 I have shown another embodiment of my filter tip apparatus, wherein provision has been made for pre-rolling the filter plugs so that they will have a true circular configuration and will be of the correct diameter.

It was found that one of the reasons why a poor joinder was obtained between the cigarette filler and the filter plugs was because the plugs differed greatly in their roundness and in their diameter one from the other. These variations, attributable in part to characteristics of the material, and to deformation in shipping and other handling, must be first corrected, if satisfactory filter tip cigarettes are to be produced.

In the embodiment shown in FIGURE 17, a drum 156 is mounted on a rotating horizontal shaft 158, which is driven by suitable means (not shown) from the main drive of the cigarette making machine. The drum 156 is partially surounded by a concave member 160 which is adjustably supported by a stub 162 held by a suitable bracket on the frame of the machine.

The mouthpiece material (which may be of sextuple length or any other desirable length) is deposited between the concave member and the roller at the upper portion of the concave from a suitable source of supply, such as the feed hopper 10 shown in FIGURE 1. The rotating roller can be rotated continuously in one direction or oscillated if desired to impart a true cylindrical configuration or shape to the mouthpiece material, so that it will be of the desired diameter. The spacing between the drum 156 and the concave 160 may be adjusted by means of suitable screws 162 so as to make the mouthpieces of the diameter desired.

In the embodiment shown in FIGURE 18, I have employed a plurality of rollers 164, 166, 168 and 170, each of which is partially surrounded by suitable concave members 172, 174, 176 and 178 arranged and spaced from their respective drums in such manner that as the plugs are advanced between one drum and concave, they will enter the space between the next adjoining drum and concave. When a plug is transferred from the space of one drum and concave to the space between the next drum and concave, the direction of rolling effected on the plug will be reversed.

The concave members 172, 174 and 176 and 178 may be adjustably spaced from their respective drums by means of suitable adjusting studs 180, 182, 184 and 186 projecting through, and coacting with, brackets secured to the machine.

When the plugs have been pre-rolled in the foregoing manner they are discharged into a reservoir such as 22, in FIG. 1. From this point on the procedure already described for cutting, conveying, assembling and uniting the components into a filter tip cigarette are followed.

Some manufacturers prefer to make filter tip cigarettes which have hollow mouthpieces formed at the ends thereof. Heretofore, such cigarettes were manufactured in machines known as stuffing machine. The usual stuffing system employs one machine to manufacture hollow, paper tubes complete with the desired type of mouthpiece. These complete tubes are then subsequently stuffed with filler tobacco in another machine. Machines of this type were obviously slow in operation and presented various problems with respect to attaining a uniform filling of the tobacco and also in attaining a desirable abutment between the filter plug material and the filler tobacco.

Figure 13:
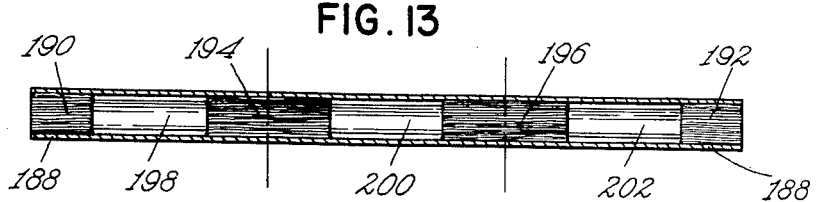
FIG. 13 is a sectional side elevation of a sextuple length hollow mouthpiece filter plug.

In the present invention, I have disclosed a method and an apparatus for carrying the method into effect for making hollow mouthpiece cigarettes as shown in FIGURES 13-16. In FIGURE 13 I have shown a sextuple length of hollow mouthpiece and filter tip material which is made up of a hollow cylindrical paper tube 188 wherein filtering material has been inserted at evenly spaced intervals. At the ends, the sextuple lengths of cigarette filter are severed across the filter material, so that the ends of the sextuple lengths of filter plug material have single length filter plugs 190 and 192.

The two center filter plugs 194 and 196 are of double lengths just like the spaces 198, 200 and 202. The sextuple lengths of composite hollow mouthpiece filter plug material shown in FIGURE 13 are stacked in the hopper in the same manner as the filter plug material shown in hopper 10 of FIGURE 1. These sextuple lengths of hollow mouthpiece filter plug material are fed from the hopper 10 into a suitable reservoir such as that shown in FIGURE 1.

Figure 14:
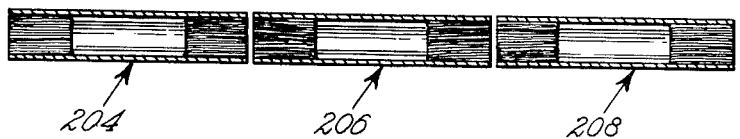
FIG. 14 is a sectional side elevation showing how a sextuple length hollow mouthpiece filter plug is severed into three double length hollow mouthpiece filter plugs.

From there the sextuple lengths of hollow mouthpiece filter plug material are received on the drum 26 which conveys them to a cutting station where they are cut transversely on the periphery of the drum into three double length hollow mouthpiece filter plugs 204, 206 and 208 as described heretofore and shown in FIGURES 1 and 14. Each double length of hollow mouthpiece filter plug material consists of single lengths of filter plug material mounted in opposite ends of the double length tube so that double length of hollow space is located between the spaced single lengths of filter plug material.

The double length filter plugs are moved laterally relative to each other by plug separating discs 38, 40 and 42 and are arranged side-by-side in a column by means of the plug aligning drum 56 shown in FIG. 1. These double length hollow mouthpiece filter plugs are then discharged in the manner described heretofore onto the assembly drum 72. One of these composite double length filter plugs is deposited into each pocket so as to position filter plug material and hollow mouthpiece material between two cut cigarette lengths.

Figure 15:
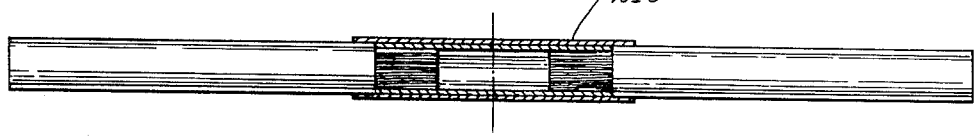
FIG. 15 is a sectional side elevation illustrating how a double length hollow mouthpiece filter plug is placed between two cigarettes and assembled by means of a cork band.

As the assembly is conveyed around by the assembly drum 72 in the manner heretofore described, a uniting band 210 is affixed to join the abutting cigarette lengths to the ends of the double length composite material in the manner shown in FIG. 15. Because cigarette lengths have been made by the machine in the manner to which the manufacturer is accustomed on his conventional cigarette making machine, the severed ends of the filter tip material are square and the abutting filter tip material which is similarly square will form a firm abutment between both elements so that when a uniting band is added there will be a firm abutment between the cigarette filler and the hollow mouthpiece filter plug.

Figure 16:
FIG. 16 is a sectional side elevation of a single cigarette with a hollow mouthpiece filter tip.

The united assembly is then carried to the cutting drum 144 where the double length hollow mouthpiece filter plug is severed across its center, making two hollow mouthpiece filter plug cigarettes of the type shown in FIG. 16.

Figure 19:
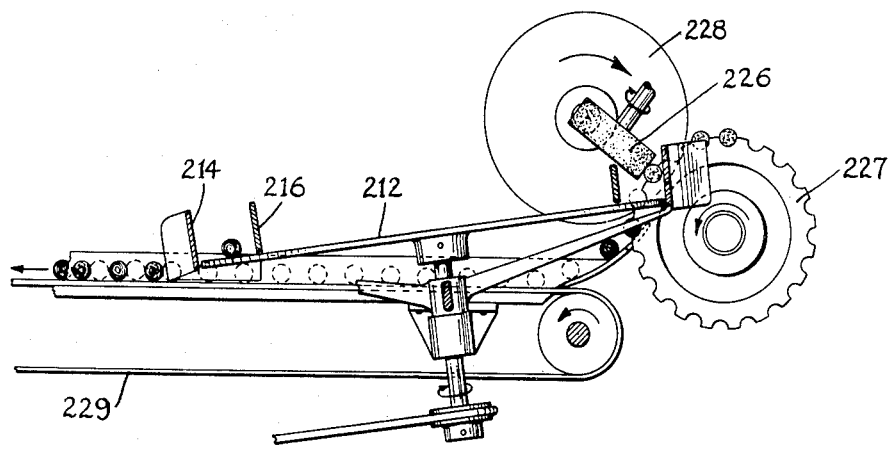
FIG. 19 is a side elevation illustrating a cigarette reversing mechanism at the delivery station of the filter tip machine.
Figure 20:
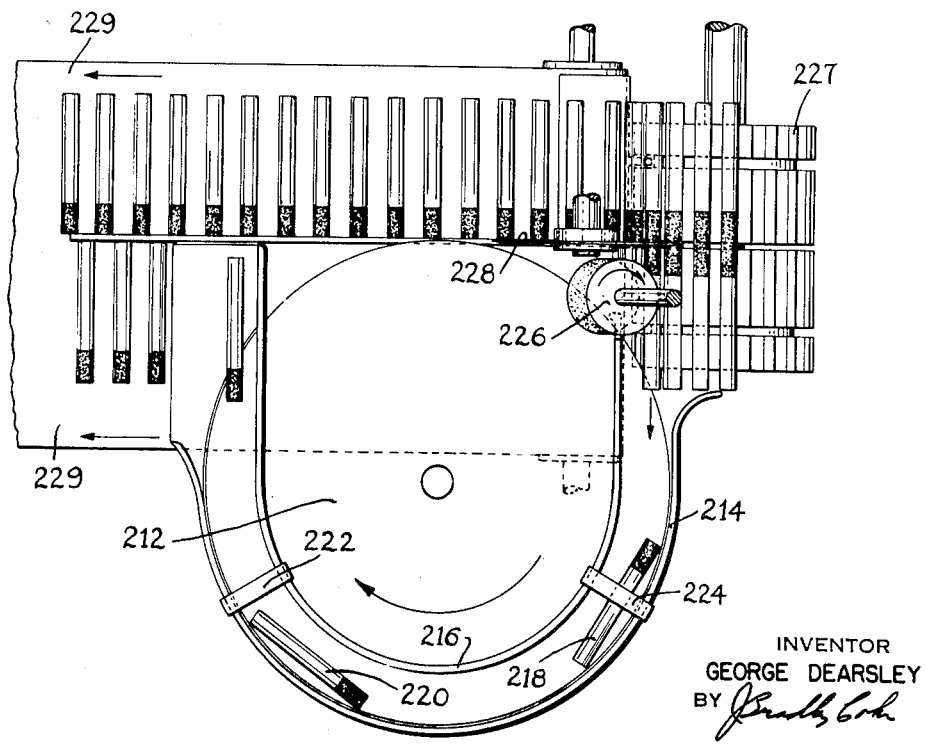
FIG. 20 is a plan view of the same.

When cigarettes are discharged from the cutting drum, as shown in FIG. 12 the filter plugs of the severed cigarette are facing each other. It is desirable that all the filter plug cigarettes have their filter plugs face in the same direction to facilitate packaging. To avoid the necessity of having an operator turn one row of cigarettes end for end, I have provided a device in FIGURES 19 and 20 which automatically turns the cigarettes end for end. This device is mounted adjacent to the cutting drum shown in FIG. 19 and comprises a disk 212 which rotates in the direction of the arrow as shown in FIGURES 19 and 20. The disc has a pair of spaced stationary walls 214 and 216, shown in FIG. 20, to confine cigarettes 218 and 220 resting on the disc to travel around with the disc between the walls 214 and 216. Upper braces 222 and 224 are provided for maintaining said guide walls at a fixed relationship to each other When the severed cigarettes reach the rotating rubber roller 226 after passing under the cutting knife 228, they are discharged in the direction indicated by the arrow onto the disc 212. After the cigarettes have been conveyed around the circular path of travel by the disc 212 they are discharged onto the collecting belt 229 as shown in FIG. 20, and all of the cigarettes have their filter ends facing in the same direction.

While I have shown the disc 212 arranged at an incline, if desired this disc could be arranged horizontally to allow the cigarettes to fall or slide down a chute onto the collecting tape 229.

Another embodiment of a plug feeding apparatus has been disclosed in FIG. 21. This embodiment is particularly desirable for operation at high speeds if it is found that plugs tend to bridge and avoid falling into the pockets of a receiving drum. In the structure shown in FIG. 21 the sextuple filter lengths are placed in a suitable hopper 230 which is somewhat similar to the hopper 10 shown in FIG. 1 and the components that obviously correspond to each other are not specifically identified in the present embodiment since reference can be made to FIGURE 1 for a more detailed description of these components.

The metering agitator flap 232 is mounted on a shaft 233 which is oscillated by means of a cam lever 235, carrying on its free end a cam roller 237. The cam roller 237 engages with a suitable cam 239 mounted on the continuously rotating shaft 241 to which is also secured the refuser 254.

The adjustable flap 232 meters the desirable amount of filters from the bulk supply hopper 230 while the vibrating bottom plate 234 controls the flow of the metered quantity of sextuple filter lengths and conveys them to the counter rotating rollers 236 and 238.

The bottom vibrating plate 234 extends up to the roller 236. Each of the rollers 236 and 238 is deeply grooved and they are controlled so that, as they are rotated, each tooth on either roller always opposes a groove on the other roller, as shown in FIG. 21. These rollers 236 and 238 rotate in opposite directions at the same speed so that the tooth relationship is maintained at all times, the objective being to provide a gap through which only one filter may pass at a time, which gap rapidly oscillates in a horizontal plane in order to facilitate the passage of the filters through the gap.

The oscillating flap 232 is employed to maintain a suitable "head" of sextuple length filters over the rollers 236 and 238 at all times without permitting the weight of the bulk of the filters in hopper 230 to press on the region where the filters are separated into single file. It has been found in the arrangements just described that the sextuple length filters never tend to bridge over the rollers 236 and 238 but are sufficiently agitated to circulate freely and flow into single file without interruption.

Once the sextuple length filters pass between the rollers 236 and 238 they are held in the single file formation by the guides 240 and 242 which also act as a reservoir so that even if the flow is temporarily interrupted filters are available to fall into the flutes 244 of the drum 246 as required. The drum 246 is made in three parts as shown in FIG. 21 to allow the two circular knives 256 and 258 to sever each sextuple length filter plug material into three equal double lengths of filter material while being moved forwardly in the grooves 244. Because of this, the grooves 244 must support the filters for at least half of their circumference in order that the filter plug not be flattened by the stress imposed when undergoing cutting by the knives 256 and 258. This consequently imposes limitations on the shape of the groove and the lead into it.

It has been found that the shape of the groove as shown in FIG. 21 satisfactorily accomplishes this objective. It will be noted that the angle of the lead 248 into the groove 244 is related to the rate at which the plugs fall so that the angular lead 248 is so shaped as to obtain the maximum velocity of the filters towards the center of the drum 246 at the point where the angular lead 248 joins the half round groove 244 so that the filters move continuously with a constant acceleration toward the center of the drum 246 from the beginning of the lead 248 until they are delivered.

It will also be noted that the shape of the channel formed by the guides 240 and 242 is such that the falling plugs have a component of movement in the direction of the moving drum 246. The shape of the curvature of the lower extremity 250 of guide 240 is also of considerable importance. This must be so shaped as to efficiently retain the filters while the plain portion 252 of the drum 246 is passing under the row of filters and yet as soon as the filters start to move towards the center of the drum 246 by sliding down the angular lead 248, the curved end 250 of guide 240 must exert a component force on the filter towards the center of the drum 246 by reason of tangential force applied by the friction of the moving drum 246 and so aid accelerating the filter towards the bottom of the groove 244.

The refuser 254 prevents jamming of the mechanism by any filter that is displaced and is not properly seated in the groove 244. Any surplus plug, and any improperly seated plug, will be refused by roller 254, without interfering with the advance of properly seated plugs toward the plug cutting knives 256 and 258, thus permitting uninterrupted operation. The refused plugs may be removed by hand.

To simplify the illustration of the foregoing invention I have omitted showing the various drives for the component parts since these components can be driven in synchronism with each other, and with the cigarette machine to which my attachment is secured, in any suitable manner such as by gears or by sprockets and sprocket chains. For further information with respect to the subject matter not claimed herein, reference should be made to my copending application S.N. 509,293 of which this is a divisional.

In the foregoing disclosure it will be understood that while reference has been made to filter plugs, this invention is also equally adaptable for use with other cylindrical mouthpieces that may not necessarily have any filtering action.

The invention hereinabove described may be varied in construction within the scope of the claims, for the particular device selected to illustrate the invention is but one of many possible embodiments of the same. The invention, therefore, is not to be restricted to the precise details of the structure shown and described.

I claim:

1. The method of making hollow mouthpiece cigarettes which comprises:
    (1) Positioning a single length of filter material at each of the opposite ends of a sextuple length of hollow mouthpiece material;
    (2) Positioning two axially spaced double lengths of filter material in said hollow mouthpiece material with an equal amount of space between the double lengths of filter material and between the double length filter material and the single lengths of filter material;
    (3) Severing said sextuple length of filter material across the center of each double length of filter material so as to form three double lengths of combined hollow mouthpiece and filter tip material.

2. The method according to claim 1 in which said hollow mouthpiece material, having said filter material therein, is positioned for said severing by moving it in the direction of its longitudinal axis in a first direction so that a first end thereof abuts against a first stop and severing a first double length filter from the opposite end, then moving the two unsevered double lengths in said first direction against a second stop substantially coplanar with said first stop.

3. The method according to claim 1 which comprises also, conveying said sextuple length material, with said filter material therein, in a sidewise direction, to a first severing station, while moving it axially in a first direction until said first end abuts a first stop and severing a first double length filter from the opposite end, then moving the two portions thus formed to a second severing station, while moving the two portions axially in said first direction, until said first end abuts a second stop, substantially coplanar with said first stop.

4. The method of forming double filter assemblies for smoking articles, each of said assemblies having a hollow tube interconnecting a filter at each end, said method comprising:
    (1) Inserting a plurality of double filters in an elongated hollow filter tube and inserting a single filter at each of the opposed ends of said elongated tube in such manner that each of said filters is spaced from the other along said tube at equal distances;
    (2) Severing at the middle of each double filter.

5. The method in accordance with claim 4 in which each of said filter assemblies is severed sequentially.

6. The method in accordance with claim 5 in which each of said assemblies is severed to substantially the same length by pushing a first end of said elongated tube sequentially against an individual one of each of a plurality of stops spaced one from another in substantially the same vertical plane and severing one of said double assemblies from the end remote from each of said stops.

References Cited by the Examiner

UNITED STATES PATENTS

| | | | |
|---|---|---|---|
| 1,235,226 | 7/1917 | Minnemann. | |
| 1,641,222 | 9/1927 | Foisy | 83—411 |
| 1,752,340 | 4/1930 | Hohn | 131—94 X |
| 1,771,295 | 7/1930 | Hafleigh. | |
| 1,885,320 | 11/1932 | Beatty | 83—418 |
| 2,002,886 | 5/1935 | Edwards et al. | 131—94 |
| 2,047,021 | 7/1936 | Friden | 83—417 |
| 2,123,580 | 7/1938 | Wheless | 83—411 |
| 2,152,416 | 3/1939 | Molins | 131—94 |
| 2,165,144 | 7/1939 | Lubbock | 131—94 |
| 2,236,150 | 3/1941 | Maltby | 83—411 |
| 2,298,955 | 10/1942 | Mason et al. | 83—420 |
| 2,321,735 | 6/1943 | Clifford | 83—411 |
| 2,398,230 | 4/1946 | Keller | 83—411 |
| 2,539,372 | 1/1951 | Metzler | 83—18 |
| 2,617,454 | 11/1952 | Booth | 164—69.1 |
| 2,707,960 | 5/1955 | Janecke | 131—10 |
| 2,740,409 | 4/1956 | Korber | 131—94 |
| 2,872,981 | 2/1959 | Fitzpatrick | 83—446 |

WILLIAM W. DYER, JR., *Primary Examiner.*

SAMUEL KOREN, ANDREW R. JUHASZ, *Examiners.*